United States Patent
Chu et al.

(10) Patent No.: US 10,303,382 B1
(45) Date of Patent: May 28, 2019

(54) APPLICATION DEFINED STORAGE DEVICE

(71) Applicant: OmniTier Storage, Inc., Santa Clara, CA (US)

(72) Inventors: Derrick Preston Chu, Santa Clara, CA (US); Suneel Indupuru, Cupertino, CA (US); Daryl Ng, San Jose, CA (US)

(73) Assignee: OmniTier Storage, Inc., Milpitas, CA (US)

( * ) Notice: Subject to any disclaimer, the term of this patent is extended or adjusted under 35 U.S.C. 154(b) by 165 days.

(21) Appl. No.: 15/407,487

(22) Filed: Jan. 17, 2017

Related U.S. Application Data

(60) Provisional application No. 62/287,701, filed on Jan. 27, 2016, provisional application No. 62/294,132, filed on Feb. 11, 2016.

(51) Int. Cl.
*G06F 3/06* (2006.01)
*G06F 12/0802* (2016.01)

(52) U.S. Cl.
CPC ............ *G06F 3/0629* (2013.01); *G06F 3/061* (2013.01); *G06F 3/0616* (2013.01); *G06F 3/0683* (2013.01); *G06F 12/0802* (2013.01); *G06F 2212/60* (2013.01)

(58) Field of Classification Search
CPC ...... G06F 3/0629; G06F 3/061; G06F 3/0616; G06F 3/0683; G06F 12/0802; G06F 2212/60
See application file for complete search history.

(56) References Cited

U.S. PATENT DOCUMENTS

| | | | |
|---|---|---|---|
| 2016/0054922 A1* | 2/2016 | Awasthi | G06F 3/0631 711/103 |
| 2016/0224497 A1* | 8/2016 | Hartman | G06F 13/409 |

* cited by examiner

*Primary Examiner* — Reginald G Bragdon
*Assistant Examiner* — Edward Wang
(74) *Attorney, Agent, or Firm* — Van Pelt, Yi & James LLP

(57) ABSTRACT

Data to be stored is received from an application. A first type of storage, having a first set of storage properties, and a second type of storage, having a second set of storage properties, are selected from based on an access characteristic associated with the data, the first set of storage properties, and the second set of storage properties. The data is stored in the selected type of storage.

16 Claims, 14 Drawing Sheets

APPLICATION DEFINED STORAGE DEVICE

CROSS REFERENCE TO OTHER APPLICATIONS

This application claims priority to U.S. Provisional Patent Application No. 62/287,701 entitled APPLICATION DEFINED STORAGE DEVICE filed Jan. 27, 2016 and claims priority to U.S. Provisional Patent Application No. 62/294,132 entitled APPLICATION DEFINED STORAGE DEVICE filed Feb. 11, 2016, both of which are incorporated herein by reference for all purposes.

BACKGROUND OF THE INVENTION

Traditionally, storage solutions have been divided into two types of storage solutions: performance optimized solutions and capacity optimized solutions. Performance optimized solutions (e.g., DRAM accessible via a DDR interface) are fast, but cannot be easily expanded and are thus capacity limited. Capacity optimized solutions (e.g., solid state drive (SSD)) offer a large amount of capacity, but are not particularly fast. New storage solutions that offer a combination of performance and capacity (e.g., in which DRAM and SSD may be combined) would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
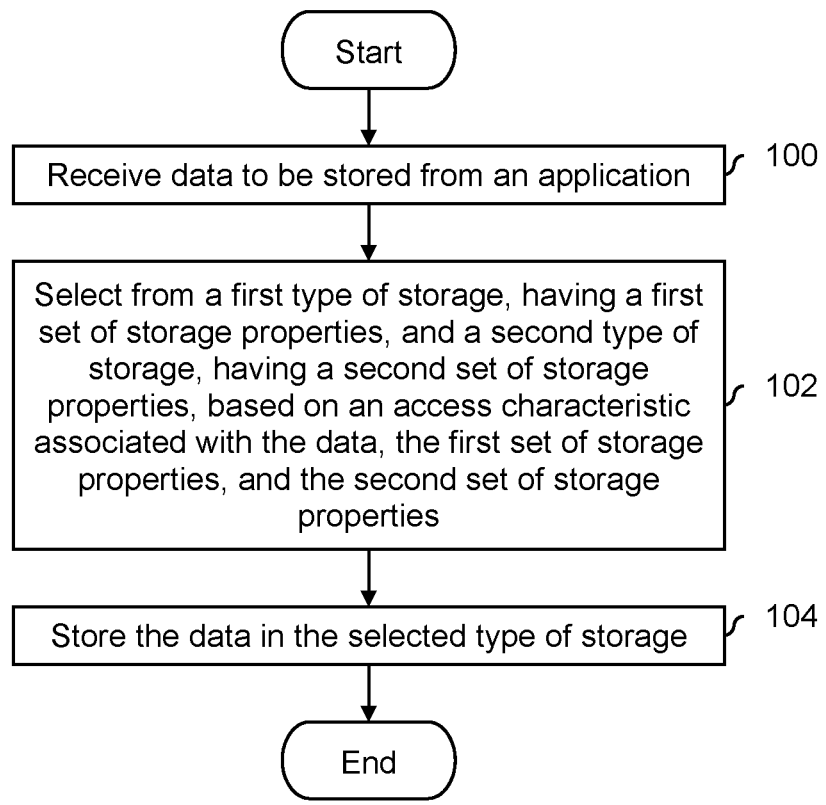
FIG. 1 is a flowchart illustrating an embodiment of a process to manage different types of storage.

FIG. 1 is a flowchart illustrating an embodiment of a process to manage different types of storage. In some embodiments, the process shown is performed by an application defined storage device. In various embodiments, the process is performed in hardware (e.g., by a field-programmable gate array (FPGA), an application-specific integrated circuit (ASIC), or a general purpose processor) or in software.

At 100, data to be stored is received from an application. The data received at step 100 may comprise any size and/or format, and any type of corresponding identifier may be used to identify the data (e.g., which is provided during a subsequent retrieval or read). In some embodiments, logical block addresses are used as identifiers. In some embodiments, the identifiers and data comprise key-value pairs. Some examples with key-value pairs (and corresponding benefits to using key-value pairs) are described in more detail below.

At 102, a selection is made from a first type of storage, having a first set of storage properties, and a second type of storage, having a second set of storage properties, based on an access characteristic associated with the data, the first set of storage properties, and the second set of storage properties. In some embodiments, the access characteristic associated with the data is specified by an application in the form of metadata. In some embodiments, an application provides no metadata, and the application defined storage device generates the access characteristic (e.g., by observing and recording information associated with previous access behavior).

It is noted that the selection at step 102 is not limited to selecting from two types of storage. Some examples described below describe selecting from four types of storage and five types of storage (see diagram 1100 and diagram 1150 in FIG. 11). To put it another way, any number of types of storage may be used and the selection at step 102 may be from any number.

In some embodiments, the access characteristic associated with the data is a desired access characteristic. Some examples include access time (e.g., how fast data can be read back from a particular type of storage) or a retention-related characteristic (e.g., long-term retention performance, such as how good a particular type of storage is at storing data for a long time, or power-down retention performance, such as whether a particular type of storage is capable of retaining data even if power is lost). In some embodiments, the access characteristic relates to the manner or way in which the data is expected to be accessed (i.e., an expected access characteristic) where the application does not necessarily desire a certain access performance. For example, some data may be overwritten with new data or deleted without replacement fairly quickly (e.g., it has a short time-to-live or it is hot data) whereas some other data may be stored, unchanged, for a long time (e.g., it has a long time-to-live or is cold data). Knowledge of the manner in which the data is expected to be accessed may permit better storage of write data in different types of storage. More detailed examples of storage properties are described in more detail below.

In various embodiments, the different types of storage at step 102 may comprise any of the following: DRAM (also referred to herein as DDR), solid state drives (SSD) (sometimes referred to as Flash), hard disk drive (HDD), or even magnetic storage (e.g., tape). For example, the following table describes different properties or characteristics of different types of storage.

TABLE 1

Examples of different types of storage and properties of those types of storage.

| Types of Storage | Cost | Access Time | Endurance | Density |
|---|---|---|---|---|
| DDR | Very High | Very Fast | Very High | Very Low |
| Storage Class Memory (SCM) | Expensive | Fast | High | Low |
| Single-Level Cell (SLC) SSD | Medium | Medium | Medium | Medium |
| Multi-Level Cell (MLC) SSD | Low | Slow | Low | High |
| HDD | Very Low | Very Slow | High | Very High |

It is noted that the types of storage described herein are merely exemplary and are not intended to be limiting.

Generally speaking, the process of FIG. 1 attempts to select the type of storage that is best for the particular needs and/or anticipated usage of the data being stored. Using different types of storage permits a less expensive system to be used (e.g., compared to implementing all of the storage in DDR which is very fast but also very expensive as shown in the table above) while still satisfying desired storage or access related goals or objectives. In some embodiments, metadata (e.g., generated by the application) is also received (e.g., in addition to the data received at step 100) and the metadata is used in making the decision about which type of storage to store the data in. In some embodiments, the decision is made without any metadata (e.g., based on the key or logical address associated with the data being stored).

At 104, the data is stored in the selected type of storage. In some embodiments, unlike some other storage solutions, the process of FIG. 1 permits data (e.g., associated with a given file) to be saved to multiple and/or different types of storage (e.g., the selection at step 102 selects more than one type of storage). For example, suppose a computer has internal hard disk drive (HDD) storage and external (e.g., connected by USB) solid state drive (SSD) storage. The HDD storage may, for example, appear as the C: drive and the SDD storage may appear as the E: drive. When saving a file with other storage solutions, a user of an application may opt to save the file wholly to HDD storage (e.g., the C: drive) or SSD storage (e.g., the E: drive), but does not have (at least with other storage solutions) the option of saving part of the file to HDD storage and part of the file to SDD storage. However, it may be desirable to store one part of the file in one type of storage (e.g., having one set of performance characteristics) and store another part of the file in a different type of storage (e.g., having a different set of performance characteristics) because of different needs and/ or different anticipated usages associated with the different parts of the file. In one example where multiple copies are stored, at least some of the data is kept on non-volatile storage and at least some of the data is kept on volatile storage (e.g., depending upon what needs to be available after a power loss). This is desirable for applications where at least some of the data needs to always be available, even after a loss of power. In another example, a copy of the data is stored on SLC SSD and another copy is kept on MLC SSD. SSD storage can be a bottleneck in some applications and so having two copies on both the SLC SSD and the MLC SSD may help with bandwidth. In another example, one copy of the data is stored on fast(er) storage and another copy of the data is stored on slow(er) storage. If a high priority read request comes in for the data, the copy stored on the fast(er) storage is read. If a low priority read request comes in for the data, the copy stored on the slow(er) storage is read.

The process of FIG. 1 may be performed at a variety of times. For example, the data stored at step 104 may be new data which has not been previously stored or otherwise observed before. Alternatively, the data stored at step 104 may already be stored in the system and is being moved to some other type of storage. For example, the system may perform a read of some stored data and decide that the access time is too slow. Step 104 (in this example at least) would include moving or otherwise relocating that data to storage with a faster access time. In various embodiments, the move may occur in the background (e.g., when the system is quiescent) or relatively soon after the read which triggered the move.

The following figures describe some examples of the process described in FIG. 1. First, some embodiments in which the application provides metadata that the application defined storage device uses to select a type of storage are described. Then, an example is given in which the application does not provide metadata for the application defined storage device to use. In some examples described herein, only the write data and write paths are described. Naturally, a real-world system that implements any of the techniques described herein also includes read capabilities but for brevity such examples are not described herein.

Figure 2:
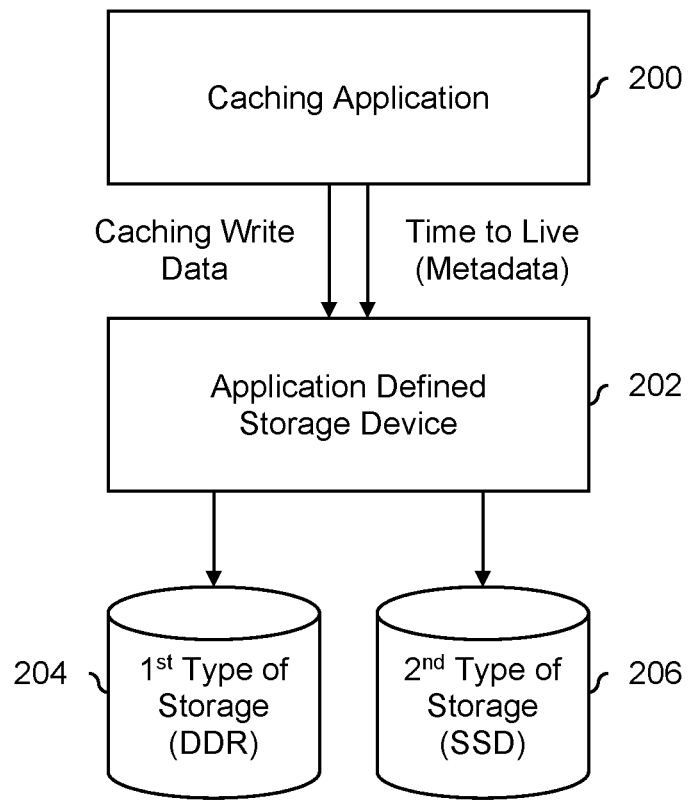
FIG. 2 is a diagram illustrating an embodiment of a caching application that provides metadata in the form of a time-to-live value to an application defined storage device.

FIG. 2 is a diagram illustrating an embodiment of a caching application that provides metadata in the form of a time-to-live value to an application defined storage device.

In the example shown, application defined storage device 202 shows one example of a device that performs the process of FIG. 1. In some embodiments, application defined storage device 202 is implemented on a semiconductor device, such as an ASIC, an FPGA, or a general purpose processor. Alternatively, application defined storage device 202 may be implemented on software.

In this example, caching application 200 performs caching services for some other application(s) not shown in this figure. Caching write data is sent from caching application 200 to application defined storage device 202. Accompanying each piece of caching write data is a corresponding piece of metadata, specifically the time-to-live for that particular piece of caching write data. The time-to-live describes how long each piece of caching write data should be stored, after which the caching write data may be discarded to make room for other cache data.

The first type of storage (204) comprises DDR storage and the second type of storage (206) comprises SSD storage. SSD storage, unlike other types of storage, "wears out" with each program or erase operation. Generally speaking, the act of programming or erasing is very stressful to solid state storage cells and causes the electrical insulation of the solid state storage cells to break down a little bit each time a program or erase occurs. This makes SSD storage that has been programmed and/or erased a relatively large number of times (i.e., "older" storage) "leaky" with respect to any stored electrical charge. Since information is stored in the form of charge in SSD storage, older SSD storage will tend to have poor long-term retention performance compared to new SSD storage. As such, excessive programming and erasing of solid state storage is undesirable. DDR storage 204 does not have this issue and can be programmed and erased as many times as desired.

For this reason, in this example, the caching write data from caching application 200 is sent to either the DDR storage (204) or the SSD storage (206) by application defined storage device 202 depending upon the corresponding time-to-live for that particular piece of caching write data. For example, if the time-to-live is less than a threshold, then that piece of data will be stored in DDR storage 204. This is because that caching data will expire sooner rather than later, hastening when that part of the storage needs to be erased. For data that is going to be stored for longer (e.g., which has a time-to-live greater than the threshold), that caching write data is sent to SSD storage 206.

As is shown in this example, one benefit to the process of FIG. 1 is that it can better distribute data amongst multiple types of storage so that the useable lifetime of SSD storage 206 is extended and/or the long-term retention performance of SSD storage 206 is improved. By storing longer-lived data on SSD storage 206 (as opposed to more transient data), the number of programs and/or erases experienced by SSD storage 206 is reduced, which provides the benefits listed above.

In some embodiments, the time-to-live threshold used by application defined storage device 202 to select between DDR storage 204 and SSD storage 206 varies depending upon the quality of the SSD storage. For example, suppose a manufacturer offers two types of SSD storage: one that is more expensive but holds up better to programming and erasing (i.e., more durable SSD storage), and a cheaper version that does not hold up to programming and erasing as well (i.e., less durable SSD storage). If the more expensive and more durable type of SSD storage is used, then a lower time-to-live threshold may be used since the SSD storage is better able to withstand the additional programming and erasing that would accompany the storage of cache data that will be deleted sooner. If the cheaper, less durable type of SSD storage is used, then a higher time-to-live threshold may be used. In other words, a time-to-live threshold (which is compared against a time-to-live value) may be tuned according to the quality or long-term retention performance of the particular type of SSD storage. Naturally, the example of FIG. 2 may be modified so that storage 204 is a more expensive type of SSD storage and storage 206 is a cheaper type of SSD storage.

In some embodiments, the time-to-live threshold used by application defined storage device 202 to select between DDR storage 204 and SSD storage 206 varies depending upon where SSD storage 206 is in its wear lifecycle. For example, suppose a representative program/erase (P/E) count (e.g., a median P/E count from a plurality of P/E counts being tracked for different parts of the SSD storage) is used as a rough metric for wear. In one straightforward example, if the representative P/E count is less than some P/E threshold, then a first time-to-live threshold value is used. If the P/E count is greater than the P/E threshold, then a second, lower time-to-live threshold value is compared against the time-to-live values (e.g., because the older SSD storage is less able to withstand programming and erasing, and so only cache data that will be kept for a fairly long time should be stored on SSD storage 206).

In some embodiments, the two techniques are combined. For example, an initial time-to-live threshold may be determined based on the quality of the SSD storage such that more durable SSD storage would have a higher initial time-to-live threshold than less durable SSD storage. That initial time-to-live threshold may then be scaled up as some representative P/E count goes up using any number of P/E thresholds or P/E ranges.

The following figure describes the above examples more formally and/or generally in a flowchart.

Figure 3:
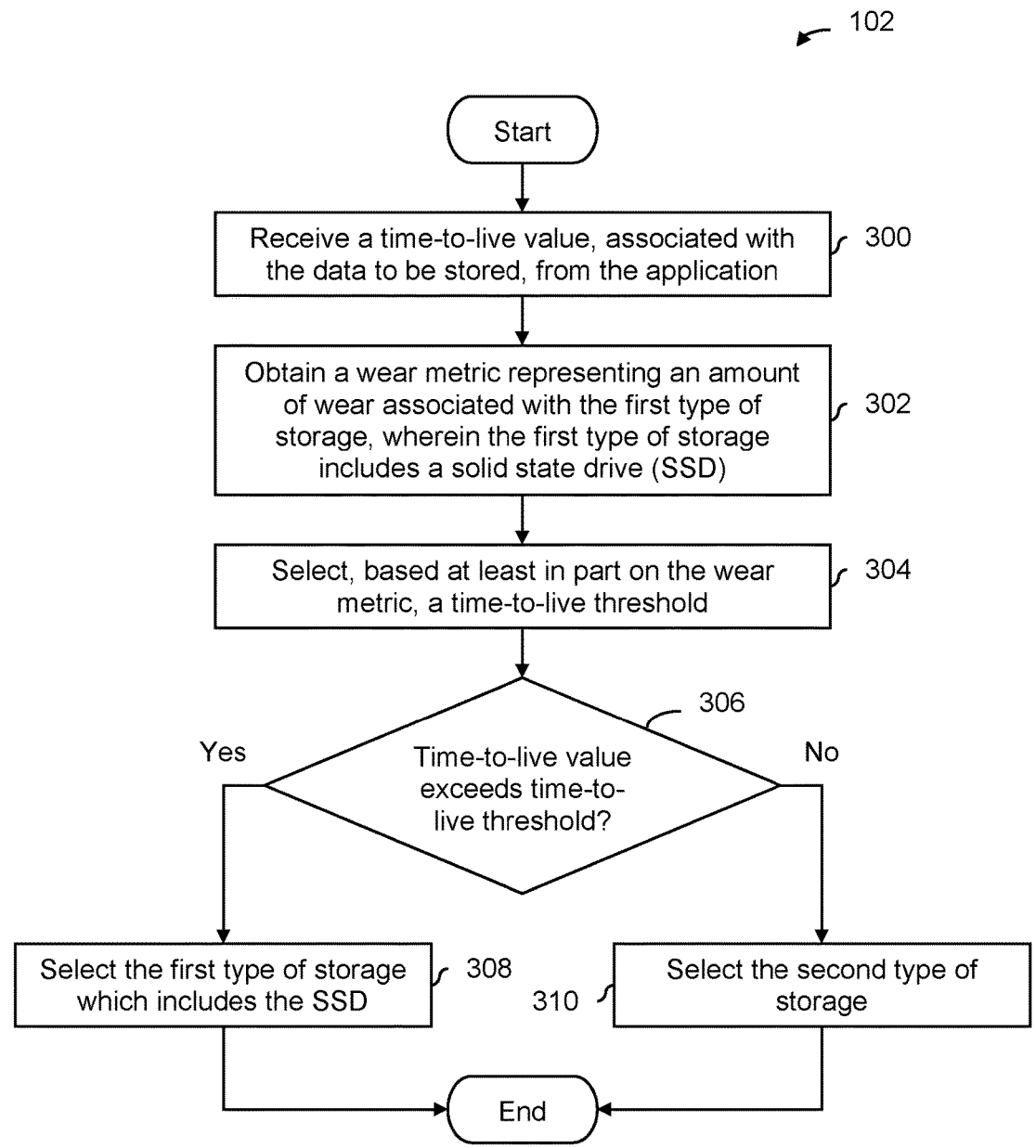
FIG. 3 is a flowchart illustrating an embodiment of a process to select a type of storage using a time-to-live value.

FIG. 3 is a flowchart illustrating an embodiment of a process to select a type of storage using a time-to-live value. Application defined storage device 202 in FIG. 2 shows an example of a device that performs the process of FIG. 3. In some embodiments, step 102 in FIG. 1 includes the process of FIG. 3.

At 300, a time-to-live value, associated with the data to be stored, is received from the application. For example, in FIG. 2, the time-to-live value is generated by caching application 200 depending upon how long that piece of data needs to be cached, after which time that piece of data can be deleted. Generally speaking, a time-to-live value describes an amount of time that a corresponding piece of data is (e.g., expected) to be stored, after which the data may be replaced with new data or deleted without replacement. In some embodiments, the time-to-live value is merely an estimate. In some embodiments, the time-to-live value is a qualitative value as opposed to a quantitative value. For example, "hot" data may be data that is expected to be deleted or replaced relatively soon and "cold" data is data that is expected to be retained for a relatively long amount of time and "hot" or "cold" may be used as time-to-live values. Or, the time-to-live value may be "short," "medium," or "long."

At 302, a wear metric representing an amount of wear associated with the first type of storage is obtained, wherein the first type of storage includes a solid state drive (SSD). For example, an SSD may maintain a plurality of P/E counts for various parts of the SSD and one of the P/E counts (e.g., the lowest P/E count, the highest P/E count, or a median P/E count) may be selected as the representative wear metric. In some embodiments, the wear metric is an estimate. As with the time-to-live value, the wear metric may be qualitative (e.g., "no/little wear," "some wear," or "excessive wear") as opposed to quantitative.

At 304, a time-to-live threshold is selected based at least in part on the wear metric. For example, as described above, the time-to-live threshold may increase as the wear metric goes up. In some embodiments, the time-to-live threshold is also selected based on the particular type of SSD storage (e.g., so that the selection at step 304 is based at least in part on the wear metric as well as the particular type of SSD storage (e.g., SLC versus MLC where SLC is more durable compared to MLC). As described above, an initial time-to-live threshold may vary depending upon how durable a particular type of SSD storage is such that a less durable type of SSD storage has a larger initial time-to-live threshold than a more durable type of SSD storage.

It is determined at 306 if the time-to-live value exceeds the time-to-live threshold. If so, the first type of storage, which includes the SSD, is selected at 308. This allows only longer-lived data that exceeds the time-to-live threshold to be stored in the SSD storage and prevents more transient data from being stored thereon.

If it is determined at 306 that the time-to-live value does not exceed the time-to-live threshold, then the second type of storage is selected at 310. That is, data that has a shorter time-to-live (at least, shorter than the time-to-live threshold) is stored in the other type of storage that presumably can better withstand programming and erasing compared to SSD. For example, it may be DDR storage.

The following figure shows an example in which an eBook reader application generates metadata for use by an application defined storage device.

Figure 4:
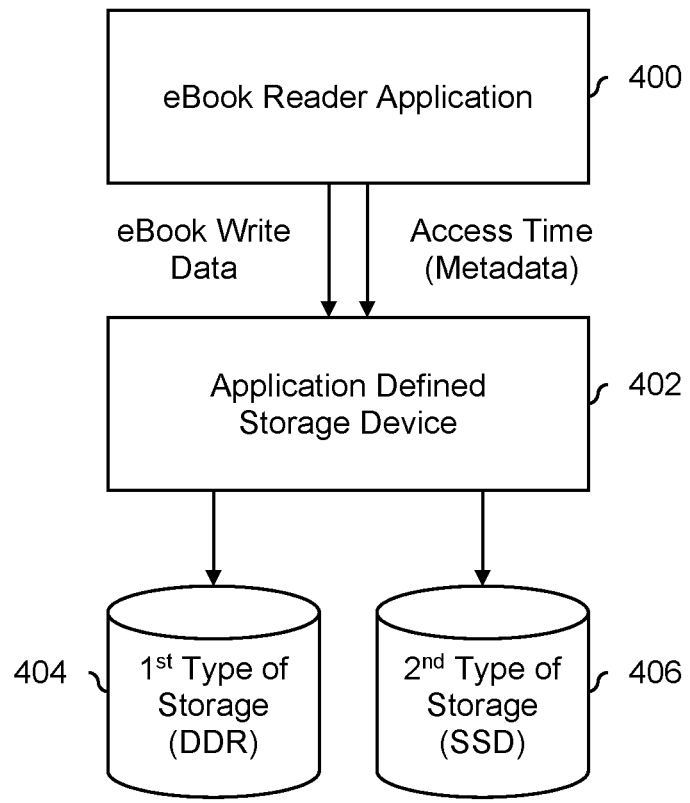
FIG. 4 is a diagram illustrating an embodiment of an eBook reader application that provides metadata in the form of an access time to an application defined storage device.

FIG. 4 is a diagram illustrating an embodiment of an eBook reader application that provides metadata in the form of an access time to an application defined storage device. In the example shown, application 400 is an eBook reader and data stored in DDR 404 can be accessed faster than data stored in SSD 406. To illustrate how the process of FIG. 1 may be used depending upon how eBook reader 400 works, two usage scenarios are described. In a first usage scenario, when eBook reader 400 is started, the eBook reader automatically shows a bookshelf view with the covers of all of the user's eBooks displayed. In a second usage scenario, when eBook reader 400 is started, the eBook reader automatically starts with the last-read eBook open, specifically at the last-read page where the user left off.

In the first scenario, it is desirable for all of the covers to be stored in DDR storage 404 since data stored thereon can be accessed faster than data stored on SSD storage 406. To accomplish this, when a new eBook is initially downloaded, the cover is passed as write data with an access time of "Fast" to application defined storage device 402. This causes the cover of a new eBook to be stored in DDR storage 404. The rest of the eBook (e.g., including the various chapters) is passed as write data from eBook read 400 to application defined storage device 402 with an access time of "Slow." This causes the rest of the new eBook to be stored on SSD storage 406 by application defined storage device 402. By storing all of the covers on DDR storage 404, eBook reader 400 can quickly load all of the covers and quickly display a bookshelf view when started. Naturally, the covers may also be stored on SSD storage 406 if desired in some other embodiments.

In the second scenario, it is desirable for the last-read page (plus some pages beyond that) of the last-read eBook to be stored on DDR storage 404. In this scenario, when a new eBook is initially downloaded, the new eBook in its entirety is passed from eBook reader 400 to application defined storage device 402 with an access time of "Slow." This causes application defined storage device 402 to store the new eBook in its entirety on SSD storage 406.

Then, when eBook reader 400 is used to read a particular eBook and before eBook reader 400 closes, eBook reader 400 sends the last-read page (plus a few additional pages beyond that page) as write data to application defined storage device 402 with an access time of "Fast." In response to the "Fast" access time, application defined storage device 402 will store those pages in DDR storage 404. In this example, to save space in DDR 404, only the last-read page plus a few pages beyond that are stored in DDR 404.

In this example, those pages from the last-read eBook are not deleted from SSD storage 406 when they are stored on DDR storage 404. This causes those pages to be stored in both DDR storage 404 as well as SSD storage 406 (at least in this second usage scenario). This mitigates the number of programs and erases experienced by SSD storage 406. To illustrate this, consider what would happen if those pages in the last-read eBook were deleted from SSD storage 406 such that those pages in the last-read eBook would only be stored in DDR storage 404. Once another eBook becomes the last-read eBook, those pages (from the now second-to-last-read eBook) would need to be rewritten to SSD storage 406. This would cause SSD storage 406 to be unnecessarily erased and then reprogrammed with data that was previously stored thereon.

By having the last-read page (plus a few additional pages) from the last-read eBook on DDR storage 404, the eBook reader can quickly load those pages and display them to the user when started. When another book is read and the application is closed, the pages associated with the now second-to-last-read eBook are deleted from DDR storage 404 (e.g., by having eBook reader 400 send a delete instruction to application defined storage device 402) and pages associated with the new last-read eBook are stored on DDR storage 404 (e.g., in the manner described above using an access time of "Fast").

In some embodiments, an application does not provide metadata to an application defined storage device to use in selecting a type of storage. For example, some applications may have been created when it was not common or necessary to provide metadata and/or it may take some time for application developers to modify their applications to output metadata that can be used by the application defined storage device. The following figure shows an example in which an application defined storage device does not receive metadata from the application.

Figure 5:
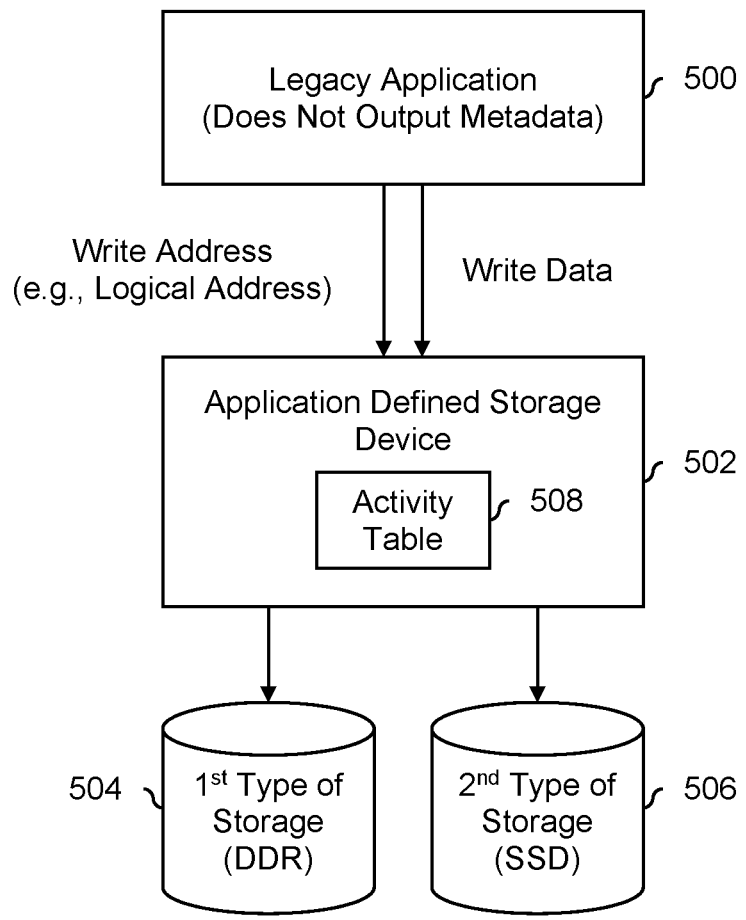
FIG. 5 is a diagram illustrating an embodiment of an application defined storage device that selects a type of storage to use without metadata from an application.

FIG. 5 is a diagram illustrating an embodiment of an application defined storage device that selects a type of storage to use without metadata from an application. In the example shown, application 500 is a legacy application that does not generate or otherwise send metadata to application defined storage device 502. Application defined storage device 502 decides whether to store write data in DDR storage 504 or SSD storage 506 based on activity information tracked by application defined storage device 502 and stored in activity table 508.

In this example, activity table 508 tracks writes, including erasures, but does not track reads. The information stored in activity table 508 includes addresses (e.g., logical addresses that have meaning to application 500 but are not physical addresses on DDR storage 504 or SSD storage 506) that are written or erased. By tracking what addresses are written or erased, application defined storage device 502 may be able to determine which addresses are associated with hot data and which addresses are associated with cold data.

In one example, activity table 508 is implemented as a first-in, first-out. When a write instruction is received, the activity table is searched for the received write address. If the write address is found more than n number of times, then the write data is classified as hot data and is stored in DDR storage 504 (e.g., space permitting). If the write address is not found within the activity table more than n number of times, then the write data is classified as cold data and is stored in SSD storage 506. DDR storage 504 is more durable compared to SSD storage 506 and so hot data is stored (where possible) in DDR storage 504 to mitigate the number of programs and/or erases experienced by SSD storage 506.

In some embodiments, to avoid additional and/or unnecessary access to DDR storage 504 and/or SSD storage 506, data is not moved from one type of storage to the other once data is stored. Rather, the temperature determination (e.g., done using the information stored in activity table 508) and subsequent storage in either DDR storage 504 or SSD storage 506 is only performed (in this example at least) when a write instruction is received.

In some embodiments, activity table 508 does not track the timestamp at which a program or erase operation is performed. That is, in some embodiments, only write address are tracked by activity table 508. This may keep the size of activity table 508 small, simplify the classification of write data (e.g., as either hot data or cold data), and/or there may be little or no additional performance improvement offered by tracking timestamps.

In some embodiments, there is often abundant SSD storage and a limited amount of DDR storage. In some such embodiments, if DDR storage 504 is full when some piece of write data is classified by application defined storage device 502 as hot data, then that piece of write data is instead stored in SSD storage 506 (e.g., because it is faster and/or more efficient to store a piece of write data less than optimally, instead of selecting a piece of write data to evict from DDR storage 504 and actually performing the eviction from DDR storage 504 and storing in SSD storage 506). In some embodiments, some threshold or criteria (e.g., associated with deciding whether a piece of received write data is hot data or cold data) is changed so that less write data is classified as hot data and more write data is classified as cold data. This would set the bar higher for what write data is classified as hot data and would cause less write/hot data to be sent to DDR storage 504.

It is noted that the time-to-live value generated by caching application 200 in FIG. 2 is similar to the hot/cold classification performed by application defined storage device 502 in this figure. For example, hot data is similar to data that has a short time-to-live, and cold data is similar to data that has a long time-to-live. To put it another way, a time-to-live value is similar to a temperature classification of hot versus cold.

Automatically determining a temperature (or, alternatively, a time-to-live) when no metadata is provided by an application may be useful because it relates to the manner in which data is accessed, which may be estimated or otherwise generated from observations of the application. In contrast, other types of access characteristics, such as a desired (access) characteristic, may be more difficult or even impossible to generate from observing the application when no metadata is provided by an application.

The following figure more formally and/or generally describes the above example in a flowchart.

Figure 6:
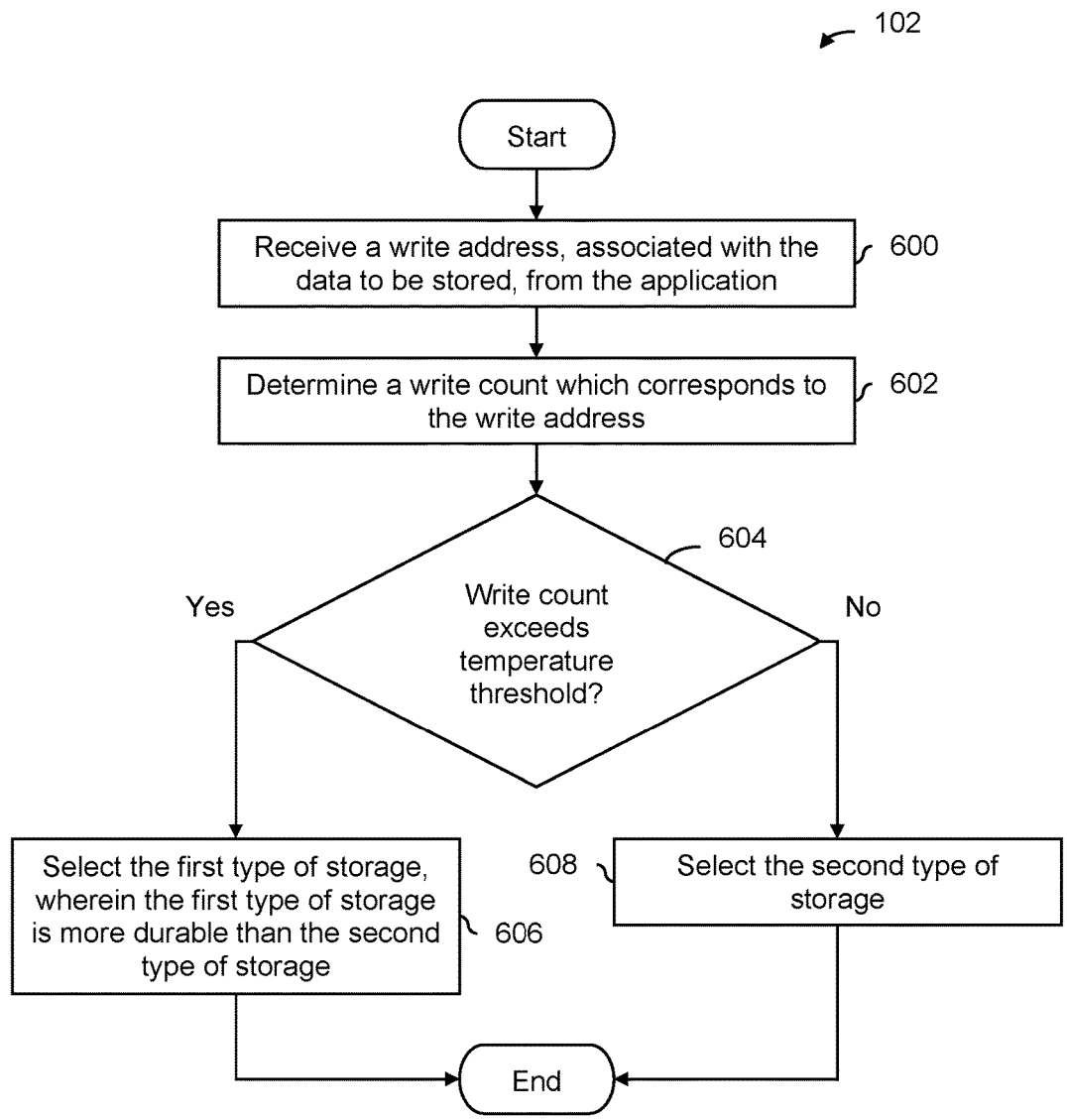
FIG. 6 is a flowchart illustrating an embodiment of a process to generate an access characteristic when no metadata is provided by an application.

FIG. 6 is a flowchart illustrating an embodiment of a process to generate an access characteristic when no metadata is provided by an application. In some embodiments, the process of FIG. 6 is used at step 102 in FIG. 1. Application defined storage device 502 in FIG. 5 shows one example of a device which may perform the process of FIG. 6. In some embodiments, the process of FIG. 6 is performed or otherwise triggered when a write instruction (e.g., which includes a write address and write data) is received.

At 600, a write address, associated with the data to be stored, is received from the application. For example, the write address may be a logical address. In embodiments where an application and application defined storage device exchange key-value pairs, the write address may be a key.

At 602, a write count which corresponds to the write address is determined. For example, an activity table may be used to track the write count for each write address. In this example at least, using the write count (as opposed to the write count plus the read count) may be sufficient because read operations do not wear out the electrical insulation of SSD storage.

At 604, it is determined whether the write count exceeds a temperature threshold. To put it another way, the temperature threshold is used to classify the write data as hot data or cold data. If the temperature threshold is exceeded at step 604, then the first type of storage which is more durable than the second type of storage is selected at 606. That is, the write data is classified as hot data and the more durable type of storage is selected.

As described above, the temperature threshold may be adjusted or otherwise tuned as desired. For example, if the DDR storage is full (e.g., because in some applications or systems there may be less DDR storage compared to SSD storage), the temperature threshold may be decreased so that less data gets classified as hot data and more data gets classified as cold data. Or, as the SSD storage gets more worn out, the temperature threshold may be increased so that colder data is stored on the SSD storage, decreasing the number of programs and erases experienced by the more worn out SSD storage.

If the temperature threshold is not exceeded at step 604, then the second type of storage which is less durable than the first type of storage is selected at 608. That is, the write data is classified as cold data and the less durable type of storage is selected.

In some embodiments, after selecting either the first type of storage at 606 or the second type of storage at 608, an activity table is updated with the write address which was just written so that the corresponding write count is updated. This ensures that the activity table is kept up to date as new writes are received from the application. In one example, the activity table is implemented as a FIFO which stores write addresses in its entries. As such, if the activity table becomes full of write addresses, the oldest write address is discarded.

The following figure describes another exemplary application or scenario in which the process of FIG. 1 may be used.

Figure 7:
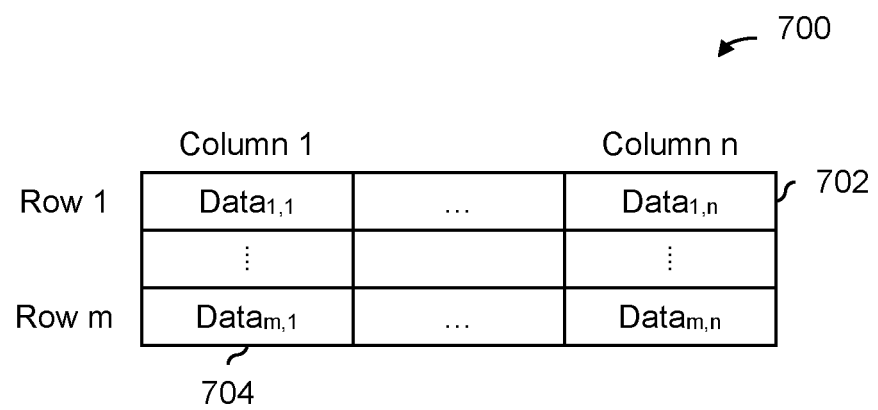
FIG. 7 is a diagram illustrating an embodiment of data associated with a table.

FIG. 7 is a diagram illustrating an embodiment of data associated with a table. In the example shown, table 700 includes n columns (such as first column 704) and m rows (such as first row 702). In various applications, an application may want to access one or more columns or rows in a particular manner (i.e., a desired access characteristic) or the application is expected to access some column(s)/row(s) in a particular manner (i.e., an expected access characteristic). In some embodiments, an application provides a row or column identifier to an application defined storage device so that data associated with a table can be stored in different types of storage in a more optimal manner (e.g., to match some desired access characteristic or expected access characteristic).

In one example, an application provides (1) a time-to-live and (2) a row or column identifier (referred to more generally as an array identifier) associated with the data to an application defined storage device. In this example, if some of the data from that row or column is not already stored on one of the types of storage, then the time-to-live value is used to select a type of storage. If data from that row or column is already stored somewhere, then the data is stored in the same type of storage. In some applications, it may be desirable to use a row or column number to keep data from the same row or column together on a same type of storage. For example, if the entire row or column is desired, it may be more efficient to only have to access a single type of storage (e.g., when the width of a particular bus or interface is larger than the size of the row or column being read, the read will fit into a single operation as opposed to two or more operations directed to two or more types of storage).

In another example, the application only provides a row or a column number. In such embodiments, the application defined storage device may analyze the application's activity in order to classify the data as hot or cold (e.g., when data from that row or column is not already stored somewhere) and select a type of storage accordingly. With the row or column number provided by the application, the application defined storage device may be able to skip the classification step, thus saving power and/or processing resources.

It is noted that systems which do not employ an application defined storage device may not be able store data from the same row or column in the same type of storage. For example, data from different rows or columns may be jumbled together in the same logical block, causing at least some of the data in the logical block to be stored in a type of storage with characteristics that do not optimally match the associated desired access characteristic or expected access characteristic.

Figure 8:
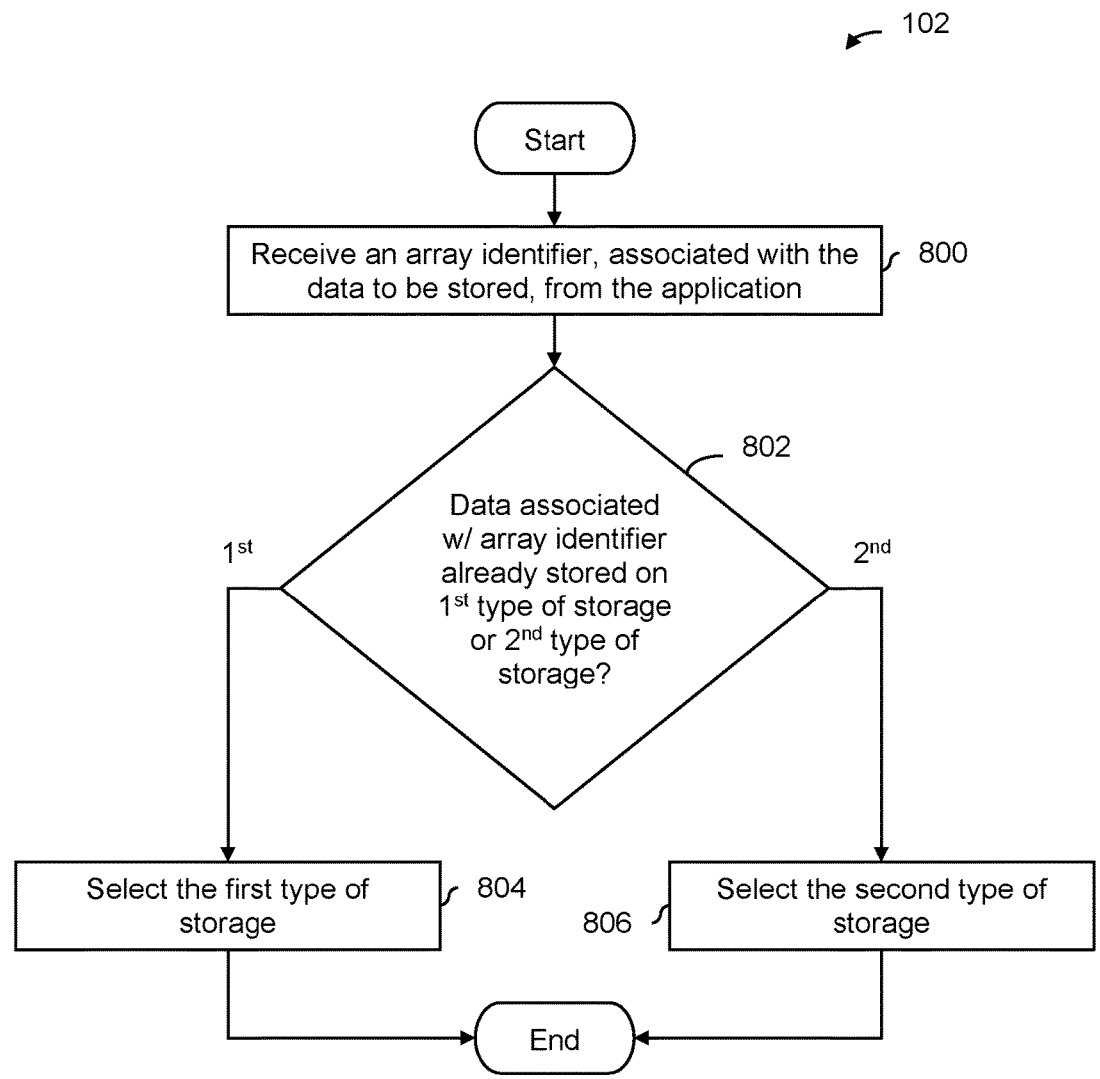
FIG. 8 is a flowchart illustrating an embodiment of a process to select a type of storage when a row identifier or a column identifier associated with a table is provided by an application.

FIG. 8 is a flowchart illustrating an embodiment of a process to select a type of storage when a row identifier or a column identifier associated with a table is provided by an application. FIG. 8 more formally and/or generally describes the example of FIG. 7 in a flowchart.

At 800, an array identifier, associated with the data to be stored, is received from the application. As described above, the array identifier may be a row identifier or a column identifier that identifies which row or column in a table the data is from.

At 802, it is determined whether data associated with the array identifier is already stored on the first type of storage or the second type of storage. If it is determined that data associated with the array identifier is already stored in the first type of storage, then at 804 the first type of storage is selected. If it is determined that data associated with the array identifier is already stored in the second type of storage, then at 806 the second type of storage is selected. As described above, this forces data from the same column or row to be stored in the same type of storage (e.g., SSD or DDR).

In some embodiments, if data associated with the array identifier is not already stored on one of the storage types, then some other technique may be employed to make the selection (not shown). For example, if the application has provided some other metadata, then that metadata may be used in the selection. Or, if not, the application's recorded activity may be used to make the selection.

The following figure illustrates an example of key-value pairs and illustrates why using key-value pairs may be attractive in some applications.

Figure 9:
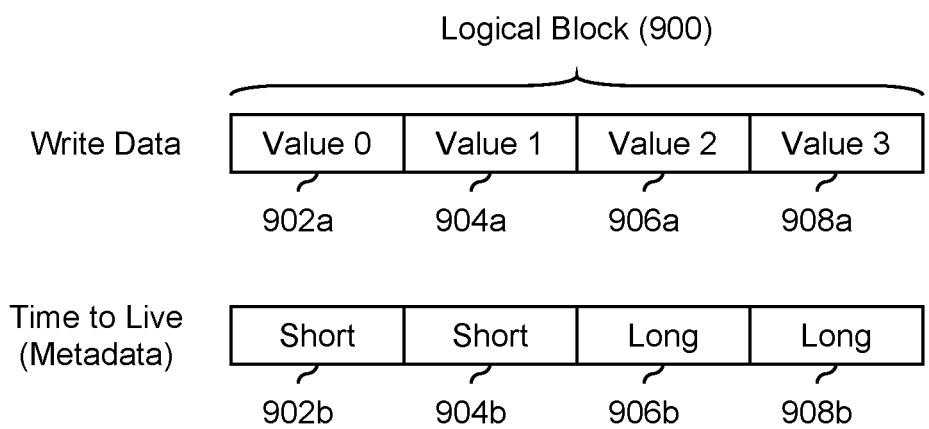
FIG. 9 is a diagram illustrating an embodiment of values (from key-values pairs) which corresponding to a logical block.

FIG. 9 is a diagram illustrating an embodiment of values (from key-values pairs) which corresponding to a logical block. In some embodiments, information is exchanged between an application (not shown) and an application defined storage device (not shown) in the form of key-value pairs. For example, when a write is performed, the key corresponds to the write address and the value corresponds to the write data. In one example of why key-value pairs might be used, the application is a caching application and an upper-level application (which the caching application provides caching services for) exchanges data with the caching application in the form of key-value pairs. In turn, the caching applications and the application defined storage device exchange key-value pairs.

In the example shown, four values from four key-value pairs are shown (902a-908a). For clarity, the corresponding keys (e.g., addresses) are not shown. The first two values (902a and 904a) have time-to-live values of "Short" (902b and 904b). To put it another way, values 902a and 904a comprise hot data that will be overwritten with new data or simply deleted relatively soon. In contrast, the third and fourth values (906a and 908a) have time-to-live values (906b and 908b) of "Long." This corresponds to cold data that will be stored for a relatively long time.

In this example, the amount of data in one logical block (900) equals the amount of data in four key-value pairs (902a-908a). As is shown in this example, logical block 900 includes write data having different properties or metadata values, in this case, a time-to-live. As a result, it would be difficult for an application to generate a time-to-live value (or other metadata) for logical block 900. Similarly, it would be difficult for an application defined storage device to determine an access characteristic for logical block 900 if the application did not provide a time-to-live value (or other metadata). As is shown in this example, using key-value pairs instead of logical blocks may be desirable so that write data can be better assigned to different types of storage. If key-value pairs are used, then write data 902a and 904a can be stored in one type of storage and write data 906a and 908a can be stored in another type of storage. In contrast, logical block 900 cannot be split and must be stored in one type of storage. As such, at least some part of logical block 900 would be stored in a less desirable type of storage.

As described above, in some embodiments, an application defined storage device is implemented as a semiconductor device. The following figure shows an example in which the application defined storage device is implemented as a PCIe card.

Figure 10:
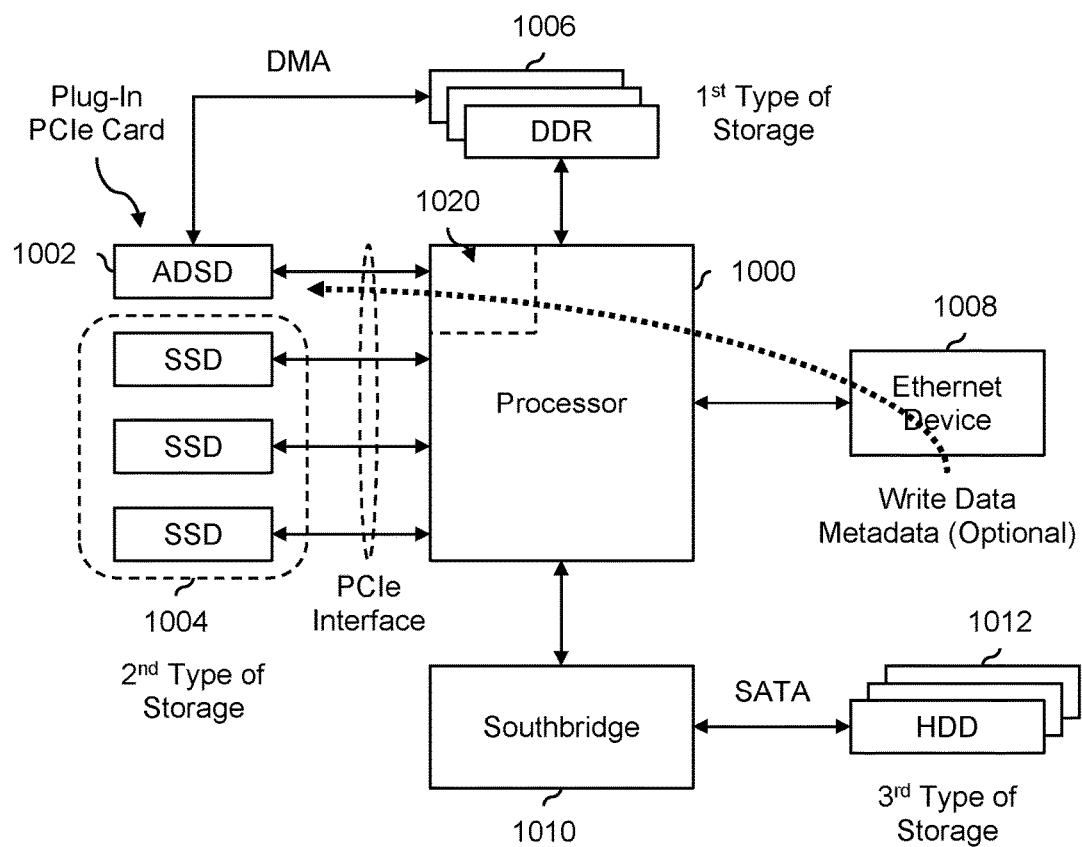
FIG. 10 is a diagram illustrating an embodiment of an application defined storage device that is implemented as a plug-in PCIe card.

FIG. 10 is a diagram illustrating an embodiment of an application defined storage device that is implemented as a plug-in PCIe card. In the example shown, application defined storage device (ADSD) 1002 is implemented as a plug-in PCIe card. This figure also shows one example of a hardware accelerator example. Application defined storage device 1002 connects to processor 1000 via a PCIe interface (or, more generally, one of the PCI interfaces). In some embodiments, processor 1000, DDR storage 1006, Ethernet device 1008, and southbridge 1010 are semiconductor devices (e.g., "chips") on a common printed circuit board (PCB), such as a computer motherboard. Such a printed circuit board may include PCIe "slots" and application defined storage device 1002 is a PCIe card that is inserted in to such a slot. In some embodiments, application defined storage device 1002 connects to processor 1000 via some other interface such as DDR3 which is faster than PCIe.

In the example shown, write data and optional metadata (such as a time-to-live, a desired access time, etc.) are received from an application (not shown) via Ethernet device 1008. For example, Ethernet device 1008 may be a semiconductor device that communicates with a network using the Ethernet protocol.

The write data and optional metadata are passed to application defined storage device 1002 via processor 1000. At application defined storage device 1002, the write data (and optionally, metadata) is processed so that an appropriate type of storage can be selected: DDR storage 1006, SSD storage 1004, or HDD storage 1012. As described above, if no metadata is provided by the application, application defined storage device 1002 may track activity using an activity table, automatically classifying or otherwise characterizing the write data so that an appropriate type of storage can be selected. Otherwise, any provided metadata is used to make the selection.

Once a type of storage is selected, the write data is sent to the appropriate type of storage for storage. If DDR storage 1006 is selected, the direct connection between DDR storage 1006 and application defined storage device 1002 is used to transfer the write data. If SSD storage 1004 is selected, then the PCIe interface (which both application defined storage device 1002 and SSD storage 1004 hang off of) is used to transfer the write data. If HDD storage 1012 is selected, then the write data is sent from application defined storage device 1002 to processor 1000 to southbridge 1010 to HDD storage 1012.

In this example, a selection is made from three types of storage (i.e., DDR storage 1006, SSD storage 1004, or HDD storage 1012). As described above, the techniques described above are applicable to any number of storage types.

In some applications, implementing an application defined storage device as a plug-in device (such as a PCIe card) is desirable because this enables an application defined storage device to be easily integrated into existing systems or printed circuit boards. For example, many existing systems or printed circuit boards already have PCIe slots. This enables an existing system or printed circuit board (e.g., without the features supported by an application defined storage device) to be upgraded without redoing the existing system or printed circuit board.

In some applications, implementing an application defined storage device as a plug-in device (such as a PCIe card) is desirable because this enables new types of storage to be added and supported without having to redo the entire system. For example, even if application defined storage device 1002 is implemented on an ASIC as opposed to an FPGA (which would require a new chip and new boards, since it is difficult and not cost effective to swap out chips that have been soldered on a printed circuit board), a new plug-in PCIe card that supports a new type of storage would be less expensive to manufacture than an entire new motherboard (e.g., which would be the case if application defined storage device 1002 were soldered on to the motherboard with processor 1000).

In some embodiments, the processor (1000) includes programmable logic (1020) which is used to implement the application defined storage device (1002). That it, in some embodiments, the application defined storage device is part of the processor itself.

If desired, different types of storage may be substituted. For example, HDD storage 1012 may be disconnected from the SATA connection with southbridge 1010 and a different type of storage may be connected. Naturally, application defined storage device 1002 includes support for a variety of storage types and would be configured so that it is aware of what types of storage are available.

As an alternative to or in addition to deciding where to store data based on write-related characteristics (such as a wear metric or retention), the application defined storage device can (also) take into account one or more read characteristics of different types of storage devices in order to optimize the read performance (e.g., as observed by the application).

For example, since HDD has high read latency and low random read performance but high sequential read performance, HDD is well suited to storing infrequently read data, large pieces of data, and/or data that is read sequentially.

In another example, DDR has the highest throughput and lowest latency thus it may be desirable to store the most frequently read pieces of data and/or data which requires the lowest latency on DDR.

If multiple SSD classes (e.g., single-level cell (SLC) where only 1 bit is stored per cell, multi-level cell (MLC) where 2 bits are stored per cell, tri-level cell (TLC) where 3 bits are stored per cell, etc.) with different performance characteristics (e.g., MLC takes longer to read than SLC and so on) are used, then the more frequently accessed data should be stored on the faster SSDs while the slower SSDs should store the less frequently accessed data. The access frequencies and/or latency requirements could be either provided by the application or could be tracked by the application defined storage device.

In some embodiments, if the application defined storage device observes that a particular storage type is the read performance bottleneck of the system, the application defined storage device then changes which storage types are used to store data (e.g., by excluding the storage type causing the bottleneck from). This could be done either retroactively (e.g., where already stored data is moved from one storage type to another and future writes will exclude the storage type causing the bottleneck), or prospectively (e.g., where already stored data is not moved but future writes exclude the storage type causing the bottleneck).

In some embodiments (such as the one shown here), an application defined storage device is implemented as a hardware accelerator. For example, in some cases, an application stores metadata along with user data to track the contents stored. For example, metadata may contain key hashes, time-to-live (TTL), sizes and pointers/indices to other data stored in the system. In some cases, the application needs to read the metadata and processes it before being able to continue operation (e.g., in order to know what user data to access and/or where to access appropriate user data). The (meta)data retrieval and processing is relatively straightforward making it suitable for a hardware accelerator to assist in the lookup and handling of data. In some embodiments, an application defined storage device is used as a hardware accelerator in order to provide increased performance (e.g., by reducing latency and/or increasing throughput) for client requests, or by offloading the burden on some host or central processor.

In one example, an application defined storage device is used as a hardware accelerator to traverse one or more lists of key indices that have collided in the hash table. To save DRAM/DDR space, in some embodiments, the keys which have the same hashes (i.e., a collision) are stored in non-volatile memory (e.g., Flash, SSD or SCM) directly coupled to an application defined storage processor. When a collision occurs, the non-volatile memory is accessed multiple times, each access requiring inspection of the data to determine if there is a match. A hardware accelerator can quickly traverse the lists of keys and provide a final result (e.g., a key was found or not or error). In some other systems, all of these accesses would have to be performed by some central or host processor (which delays or otherwise impedes other tasks performed by that processor) and/or slower storage types are accessed (e.g., which have to be accessed via some shared interface as opposed to a direct and/or dedicated connection).

The following figure describes two examples where data is assigned to different types of storage based on read related characteristics.

Figure 11:
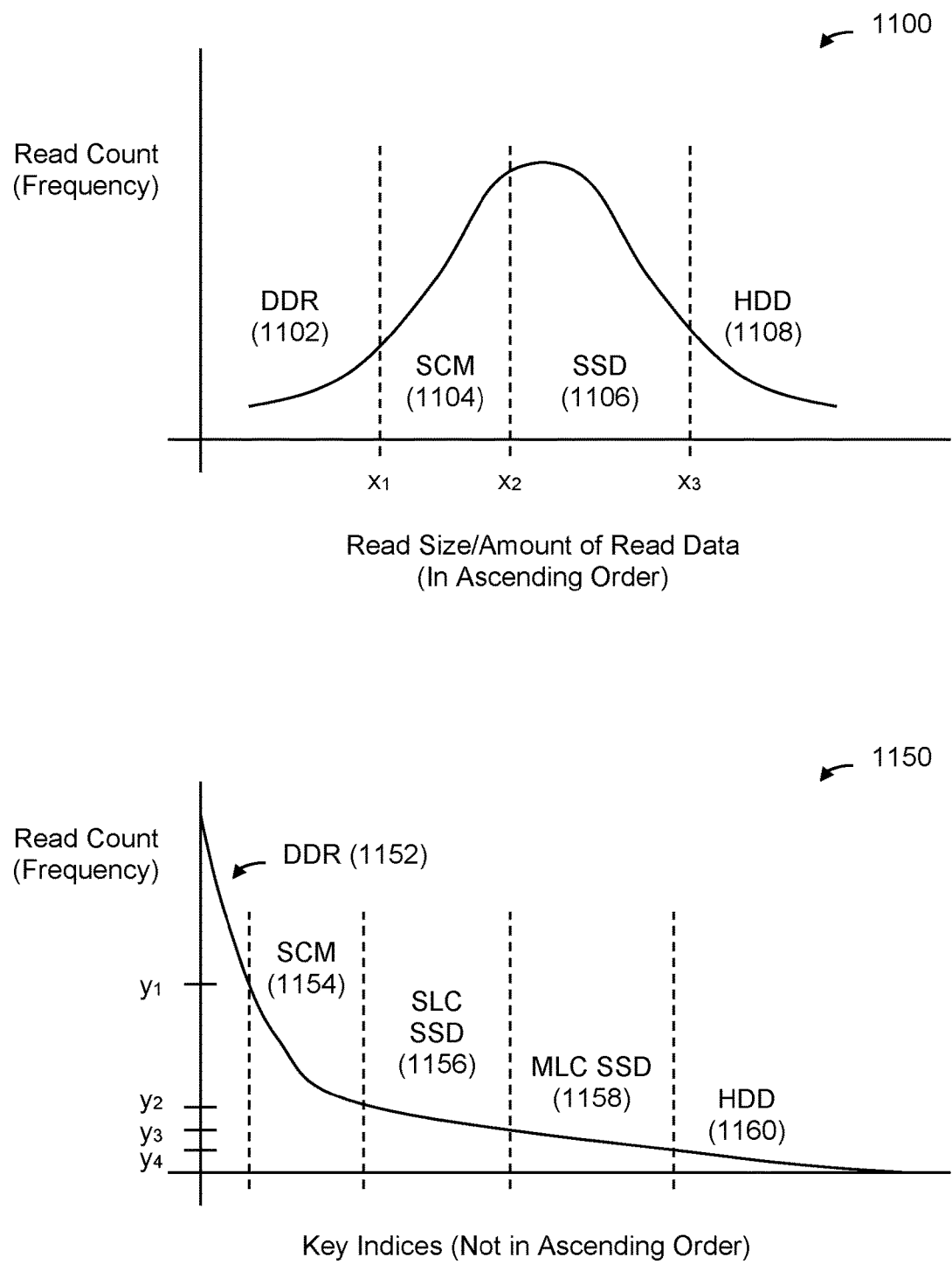
FIG. 11 is a diagram illustrating an embodiment of data assigned to different types of storage based on read related characteristics.

FIG. 11 is a diagram illustrating an embodiment of data assigned to different types of storage based on read related characteristics. In some embodiments, an application defined storage device assigns data to different types of storage according to diagram 1100 and/or diagram 1150.

Diagram 1100 is a histogram associated with different key-value pair sizes or amounts of read data (e.g., associated with a single read instruction). In this example, the x-axis shows key-value pair size in sorted order, such that key-value pair size group 1102 corresponds to small sized chunks of data, key-value pair size group 1104 corresponds to reading medium sized chunks of data, key-value pair size group 1106 corresponds to reading large sized chunks of data, and key-value pair size group 1108 corresponds to reading very large sized chunks of data. In this particular example, the diagram shows a bell curve like distribution, but the distribution shown is merely exemplary and is not intended to be limiting.

In this example, data associated with key-value pair size group 1102 is stored in DDR, data associated with key-value pair size group 1104 is stored in storage class memory (SCM) such as Intel's XPoint, data associated with key-value pair size group 1106 is stored in SSD, and data associated with key-value pair size group 1108 is stored in HDD. For example, a type of storage to initially store the data on may be selected using any technique (e.g., assign to the most abundant and/or cheapest type of storage, one of the techniques described above, etc.). When a read is performed, the amount of data being read is compared against the thresholds $x_1$, $x_2$, and $x_3$ (shown in diagram 1100) in order to determine the corresponding key-value pair size group: group 1102, group 1104, group 1106, or group 1108. For example, if the amount of data being read falls between $x_1$ and $x_2$, then the read corresponds to group 1104. The read data is then moved, if needed, to the type of storage which corresponds to that group. To continue the example from above, group 1104 corresponds to SCM storage, so the read data is moved to SCM storage if it is not already stored thereon. As described above, the move (if needed) may occur relatively soon after the read or the move may occur in the background when the system is quiescent.

It is noted that reads do not necessarily match or correspond to writes. For example, the data being read may include data that written over multiple write instructions (e.g., data X is written using a first write instruction, data Y is subsequently written using a second write instruction, and then data (X and Y) are read in a single read instruction). Or, the data being read may be a subset of the data that was written together or at the same time. For example, data (X and Y) may be written with a single write instruction and then data X (but not data Y) is read.

Diagram 1150 shows another example with key-value pairs where information is arranged differently compared to diagram 1100. In diagram 1100, the key-value pair size (i.e., along the x-axis) is sorted in ascending order so that when going from left to right along the x-axis, the key-value pair size increases. The smallest key-value pair size is goes first (i.e., leftmost) in diagram 1100, then the next smallest key-value pair size, and so on. For example, $x_1 < x_2 < x_3$.

In contrast, in diagram 1150, the x-axis (in that example, key index) is not in ascending or sorted order. Rather, the diagram is based on descending read count (frequency) order, which corresponds to the y-axis. The key index with the highest read count goes first (i.e., leftmost in the graph), then the key index with the next highest read count goes next, and so on. As a result, the read count decreases going from left to right and the key indices are in whatever order corresponds to that (i.e., the key indices are not in ascending order in diagram 1150).

Read count group 1152 is associated with those key indices (or, more generally, addresses or identifiers) which have the highest read counts or frequencies, read count group 1154 is associated with those key indices which have the second highest read counts or frequencies, read count group 1156 is associated with those key indices which have the middle highest read counts or frequencies, read count group 1158 is associated with those key indices which have the second lowest read counts or frequencies, and read count group 1160 is associated with those key indices which have the lowest read counts or frequencies. Note that the thresholds $y_1$-$y_4$ (shown along the y-axis) define the boundaries of the read count groups. Data corresponding to each of these read count groups are assigned to and stored in DDR, SCM, SLC SSD, MLC SSD, and HDD, respectively.

For example, as described above, data may be initially stored in some type of storage (e.g., assigned to a default, assigned using the process of FIG. 1, etc.). When a read occurs, the read count (or, alternatively, frequency) corresponding to the key index being read is determined. For example, the application defined storage device may have an activity table to track key indices and corresponding read counts. The read count is then used to determine the appropriate read count group. For example, if a particular key index being read has a read count that falls between $y_1$ and $y_2$, then the read corresponds to read count group 1154. If the data corresponding to the key index being read is not already stored on SCM, then the value is moved to SCM (e.g., immediately or later when the system is not busy).

The following figures describe the above examples more formally and/or generally in flowcharts.

Figure 12:
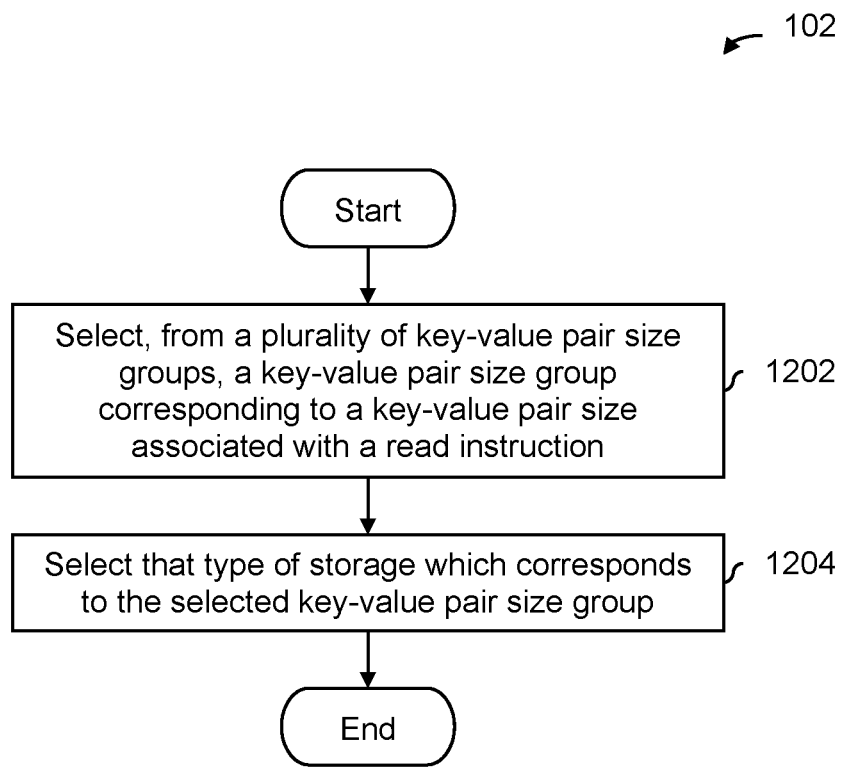
FIG. 12 is a flowchart illustrating an embodiment of a process to select a type of storage based on key-value pair size.

FIG. 12 is a flowchart illustrating an embodiment of a process to select a type of storage based on key-value pair size. In some embodiments, selecting a type of storage at step 102 in FIG. 1 includes the process of FIG. 12. In some such embodiments, the data received at step 100 in FIG. 1 is initially stored (e.g., on a type of storage selected using any technique) before the process of FIG. 12 (which includes or is associated with reading) is performed. The process of FIG. 12 is then performed to move or relocate (if needed) the data being read to a better type of storage if not already stored thereon.

At 1202, a key-value pair size group corresponding to the key-value pair size associated with the read instruction is selected from a plurality of key-value pair size groups. See, for example, key-value pair size groups 1102, 1104, 1106, and 1108 shown in FIG. 11 where the thresholds $x_1$, $x_2$, and $x_3$ define the key-value pair size groups. If the key-value pair size is less than $x_1$, then the key-value pair size group 1102 is selected.

At 1204, that type of storage which corresponds to the selected key-value pair size group is selected. For example, for key-value pair size group 1102 in FIG. 11, the corresponding type of storage is DDR storage. If the data being read is not already stored on SCM storage then it is moved (e.g., at any appropriate time).

Figure 13:
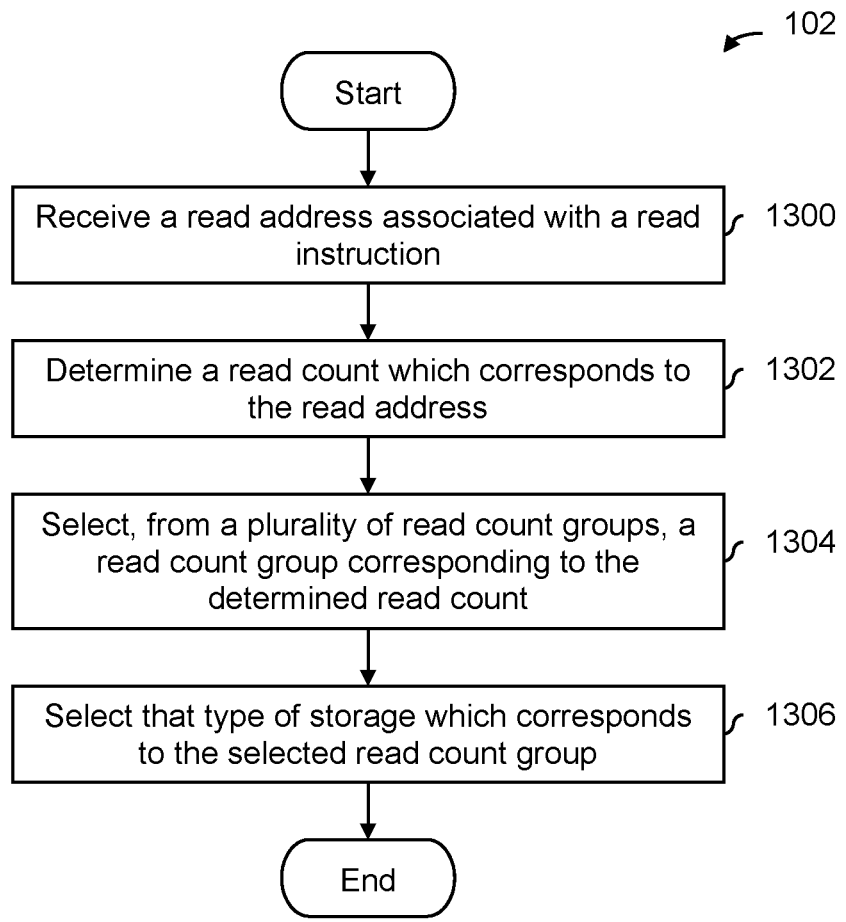
FIG. 13 is a flowchart illustrating an embodiment of a process to select a type of storage based on read count.

FIG. 13 is a flowchart illustrating an embodiment of a process to select a type of storage based on read count. In some embodiments, selecting a type of storage at step 102 in FIG. 1 includes the process of FIG. 13. In some such embodiments, the data received at step 100 in FIG. 1 is initially stored (e.g., on a type of storage selected using any technique) before the process of FIG. 13 (which includes or is associated with reading) is performed. The process of FIG. 13 is then performed to move or relocate (if needed) the data being read to a better type of storage if not already stored thereon.

At 1300, a read address associated with a read instruction is received. For example, in diagram 1150 in FIG. 11, the read addresses in that example are key indices (e.g., associated with key-value pairs) which are read.

At 1302, a read count which corresponds to the read address is determined. For example, the read count may obtained from an activity table which tracks the number of reads for each read address.

At 1304, a read count group corresponding to the determined read count is selected from a plurality of read count groups. For example, in diagram 1150 in FIG. 11, read count groups 1152, 1154, 1156, 1158, and 1160 are defined by the thresholds $y_1$-$y_4$. If the read count falls between $y_1$ and $y_2$, then read count group 1154 is selected.

At 1306, that type of storage which corresponds to the selected read count group is selected. For example, read count group 1154 in FIG. 11 corresponds to SCM storage and the data being read would be moved (if needed) to SCM storage if it is not already stored thereon.

Figure 14:
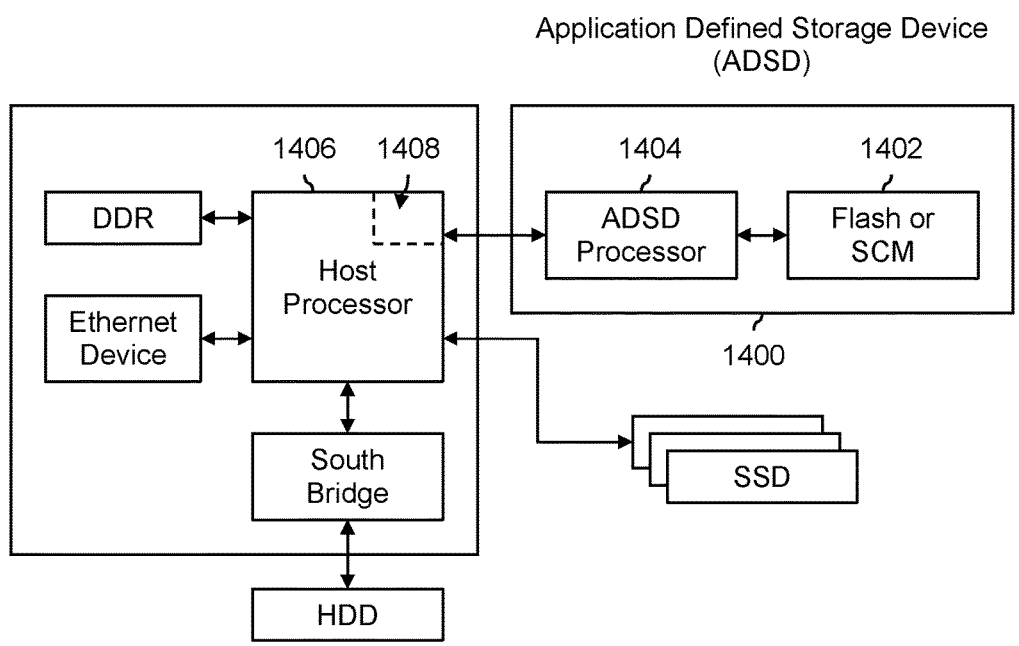
FIG. 14 shows an embodiment of a system where an application defined storage device includes an application defined storage device processor directly coupled to non-volatile memory.

FIG. 14 shows an embodiment of a system where an application defined storage device (1400) includes an application defined storage device processor directly coupled to non-volatile memory. This figure shows another hardware accelerator example. In some embodiments, key indices are stored in Flash or SCM (1402) connected to the application defined storage device (ADSD) processor (1404). It is noted that Flash and SCM are both non-volatile which is important since key indices need to be available even after an unexpected loss of power. In some embodiments, the application defined storage device (1400) is implemented in the host processor (1406) using programmable logic (1408).

A system with an application defined storage device and different types of storage devices (e.g., DDR, HDD, SSD and/or SCM as shown in the example here) is able to increase reliability while reducing overall storage overhead. Some other large capacity systems use techniques such as RAID to protect the data. These techniques assume that underlying storage media is homogenous with similar failure characteristics. In contrast, systems with an application defined storage device have are heterogeneous devices (e.g., different classes of SSD with varying reliability (e.g., SLC, MLC, TLC, etc.), HDD, DRAM, storage class memory, etc.) with different wear and/or failure characteristics. By having some understanding of (as an example) failure characteristics and/or wear metrics, an application defined storage device is able to apply necessary protection to each storage device with a global view for maximum reliability of overall system.

In one example, to protect data stored on low(er) reliability SSDs, a high(er) overhead erasure code (e.g., applied to multiple storage devices) is used while a low(er) overhead erasure code is used on high(er) reliability SSD.

In some cases, reliability varies with time for some types of storage devices. In some embodiments, at the beginning of a storage device's life, the application defined storage device employs a low(er) overhead code to save space. The application defined storage device can then increase the strength of the code (and correspondingly consuming more overhead) as the storage devices wear or otherwise get older by keeping track of device wear metrics. For example, this wear and/or retention is typically an issue for SSD and so SSD devices usually track P/E counts (a type of wear metric) to various parts of the SSD device. In some embodiments, once a particular wear P/E count exceeds some threshold, a stronger code is used. In some embodiments, because different parts of a given SSD chip or device have different counts, codes of different strengths are used for the same SSD chip or device at the same time. In some embodiments, the application defined storage device keeps track of what code is used for what data. This enables the system to switch to a stronger code, without having to decode and read older data (encoded with a weaker code), encode the older data with the new, stronger code, and then write it back to the SSD.

In some embodiments, a code is applied to multiple storage devices and the application defined storage device uses the code to read back data when the desired storage device is busy. For example, suppose that some desired data is stored on a SSD but the SSD is undergoing garbage collection and will be unavailable for an unknown amount of time. Or, a large amount of data is being written to a particular SSD and that SSD device is the desired SSD. In some embodiments, the application defined storage devices reads the other relevant storage devices associated with the code (e.g., DDR, HDD, any other SSD devices other than the desired SSD device, and/or SCM) and uses the code to reconstruct the desired data. In some embodiments, since reading multiple devices and performing the decoding may take a not insignificant amount of time, this read technique is used primarily as a backup when the desired storage device is (e.g., temporarily) unavailable.

In some embodiments, some of the functions to accelerate error recovery procedure can be performed by an application defined storage device to reduce the burden on some host processor, thereby reducing the latency spikes during the error recovery. For example, if an error recovery procedure for an SSD device includes "sweeping" an SSD with different read thresholds, then the sweeping may be done by an application defined storage device instead of a host processor.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor; and
a memory coupled with the processor, wherein the memory is configured to provide the processor with instructions which when executed cause the processor to:
 receive data to be stored from an application;
 select from a first type of storage, having a first set of storage properties, and a second type of storage, having a second set of storage properties, based on an access characteristic associated with the data, the first set of storage properties, and the second set of
storage properties, wherein selecting includes:
   selecting, from a plurality of key-value pair size
      groups, a key-value pair size group corresponding
      to a key-value pair size associated with a read
      instruction; and
   selecting that type of storage which corresponds to
      the selected key-value pair size group; and
   store the data in the selected type of storage.

2. The system recited in claim 1, wherein the application includes a caching application, the access characteristic is received from the caching application; and the access characteristic includes a time-to-live value.

3. The system recited in claim 1, wherein selecting includes:
   receiving a time-to-live value, associated with the data to be stored, from the application;
   obtaining a wear metric representing an amount of wear associated with the first type of storage, wherein the first type of storage includes a solid state drive (SSD);
   selecting, based at least in part on the wear metric, a time-to-live threshold;
   determining if the time-to-live value exceeds the time-to-live threshold;
   in the event it is determined that the time-to-live value exceeds the time-to-live threshold, selecting the first type of storage that includes the SSD; and
   in the event it is determined that the time-to-live value does not exceed the time-to-live threshold, selecting the second type of storage.

4. The system recited in claim 1, wherein selecting includes:
   receiving an array identifier, associated with the data to be stored, from the application;
   determining whether data associated with the array identifier is already stored on the first type of storage or the second type of storage;
   in the event it is determined that data associated with the array identifier is already stored on the first type of storage, selecting the first type of storage; and
   in the event it is determined that data associated with the array identifier is already stored on the second type of storage, selecting the second type of storage.

5. The system recited in claim 1, wherein the system is implemented as a plug-in PCIe card.

6. A system, comprising:
   a processor; and
   a memory coupled with the processor, wherein the memory is configured to provide the processor with instructions which when executed cause the processor to:
      receive data to be stored from an application;
      select from a first type of storage, having a first set of storage properties, and a second type of storage, having a second set of storage properties, based on an access characteristic associated with the data, the first set of storage properties, and the second set of storage properties, wherein selecting includes:
         receiving a write address, associated with the data to be stored, from the application;
         determining a write count which corresponds to the write address;
         determining if the write count exceeds a temperature threshold;
         in the event it is determined that the write count exceeds the temperature threshold, selecting the first type of storage, wherein the first type of storage is more durable than the second type of storage; and
         in the event it is determined that the write count does not exceed the temperature threshold, selecting the second type of storage; and
      store the data in the selected type of storage.

7. A system, comprising:
   a processor; and
   a memory coupled with the processor, wherein the memory is configured to provide the processor with instructions which when executed cause the processor to:
      receive data to be stored from an application;
      select from a first type of storage, having a first set of storage properties, and a second type of storage, having a second set of storage properties, based on an access characteristic associated with the data, the first set of storage properties, and the second set of storage properties, wherein selecting includes:
         receiving a read address associated with a read instruction;
         determining a read count which corresponds to the read address;
         selecting, from a plurality of read count groups, a read count group corresponding to the determined read count; and
         selecting that type of storage which corresponds to the selected read count group; and
      store the data in the selected type of storage.

8. A method, comprising:
   receiving data to be stored from an application;
   selecting from a first type of storage, having a first set of storage properties, and a second type of storage, having a second set of storage properties, based on an access characteristic associated with the data, the first set of storage properties, and the second set of storage properties, wherein selecting includes:
      selecting, from a plurality of key-value pair size groups, a key-value pair size group corresponding to a key-value pair size associated with a read instruction; and
      selecting that type of storage which corresponds to the selected key-value pair size group; and
   storing the data in the selected type of storage.

9. The method recited in claim 8, wherein the application includes a caching application, the access characteristic is received from the caching application; and the access characteristic includes a time-to-live value.

10. The method recited in claim 8, wherein selecting includes:
   receiving a time-to-live value, associated with the data to be stored, from the application;
   obtaining a wear metric representing an amount of wear associated with the first type of storage, wherein the first type of storage includes a solid state drive (SSD);
   selecting, based at least in part on the wear metric, a time-to-live threshold;
   determining if the time-to-live value exceeds the time-to-live threshold;
   in the event it is determined that the time-to-live value exceeds the time-to-live threshold, selecting the first type of storage that includes the SSD; and
   in the event it is determined that the time-to-live value does not exceed the time-to-live threshold, selecting the second type of storage.

11. The method recited in claim 8, wherein selecting includes:
  receiving an array identifier, associated with the data to be stored, from the application;
  determining whether data associated with the array identifier is already stored on the first type of storage or the second type of storage;
  in the event it is determined that data associated with the array identifier is already stored on the first type of storage, selecting the first type of storage; and
  in the event it is determined that data associated with the array identifier is already stored on the second type of storage, selecting the second type of storage.

12. A method, comprising:
  receiving data to be stored from an application;
  selecting from a first type of storage, having a first set of storage properties, and a second type of storage, having a second set of storage properties, based on an access characteristic associated with the data, the first set of storage properties, and the second set of storage properties, wherein selecting includes:
    receiving a write address, associated with the data to be stored, from the application;
    determining a write count which corresponds to the write address;
    determining if the write count exceeds a temperature threshold;
    in the event it is determined that the write count exceeds the temperature threshold, selecting the first type of storage, wherein the first type of storage is more durable than the second type of storage; and
    in the event it is determined that the write count does not exceed the temperature threshold, selecting the second type of storage; and
  storing the data in the selected type of storage.

13. A method, comprising:
  receiving data to be stored from an application;
  selecting from a first type of storage, having a first set of storage properties, and a second type of storage, having a second set of storage properties, based on an access characteristic associated with the data, the first set of storage properties, and the second set of storage properties, wherein selecting includes:
    receiving a read address associated with a read instruction;
    determining a read count which corresponds to the read address;
    selecting, from a plurality of read count groups, a read count group corresponding to the determined read count; and
    selecting that type of storage which corresponds to the selected read count group; and
  storing the data in the selected type of storage.

14. A computer program product, the computer program product being embodied in a non-transitory computer readable storage medium and comprising computer instructions for:
  receiving data to be stored from an application;
  selecting from a first type of storage, having a first set of storage properties, and a second type of storage, having a second set of storage properties, based on an access characteristic associated with the data, the first set of storage properties, and the second set of storage properties, wherein selecting includes:
    selecting, from a plurality of key-value pair size groups, a key-value pair size group corresponding to a key-value pair size associated with a read instruction; and
    selecting that type of storage which corresponds to the selected key-value pair size group; and
  storing the data in the selected type of storage.

15. A computer program product, the computer program product being embodied in a non-transitory computer readable storage medium and comprising computer instructions for:
  receiving data to be stored from an application;
  selecting from a first type of storage, having a first set of storage properties, and a second type of storage, having a second set of storage properties, based on an access characteristic associated with the data, the first set of storage properties, and the second set of storage properties, wherein selecting includes:
    receiving a write address, associated with the data to be stored, from the application;
    determining a write count which corresponds to the write address;
    determining if the write count exceeds a temperature threshold;
    in the event it is determined that the write count exceeds the temperature threshold, selecting the first type of storage, wherein the first type of storage is more durable than the second type of storage; and
    in the event it is determined that the write count does not exceed the temperature threshold, selecting the second type of storage; and
  storing the data in the selected type of storage.

16. A computer program product, the computer program product being embodied in a non-transitory computer readable storage medium and comprising computer instructions for:
  receiving data to be stored from an application;
  selecting from a first type of storage, having a first set of storage properties, and a second type of storage, having a second set of storage properties, based on an access characteristic associated with the data, the first set of storage properties, and the second set of storage properties, wherein selecting includes:
    receiving a read address associated with a read instruction;
    determining a read count which corresponds to the read address;
    selecting, from a plurality of read count groups, a read count group corresponding to the determined read count; and
    selecting that type of storage which corresponds to the selected read count group; and
  storing the data in the selected type of storage.

* * * * *